(12) United States Patent  (10) Patent No.: US 9,398,006 B2
Chang et al.  (45) Date of Patent: Jul. 19, 2016

(54) SMART SPACE ACCESS METHOD, SYSTEM, CONTROLLER, AND SMART SPACE INTERFACE SERVER

(71) Applicants: Huawei Technologies Co., Ltd., Shenzhen, Guangdong (CN); Xi'an Jiaotong University, Xi'an, Shanxi (CN)

(72) Inventors: Heng Chang, Shenzhen (CN); Yazhe Tang, Xi'an (CN); Qifeng Ma, Shenzhen (CN); Yan Li, Shenzhen (CN)

(73) Assignees: Xi'an Jiaotong University, Xi'an (CN); Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 14/143,577

(22) Filed: Dec. 30, 2013

(65) Prior Publication Data

US 2014/0115685 A1 Apr. 24, 2014

Related U.S. Application Data

(63) Continuation of application No. PCT/CN2012/080158, filed on Aug. 15, 2012.

(30) Foreign Application Priority Data

Aug. 15, 2011 (CN) .......................... 2011 1 0232473

(51) Int. Cl.
*H04L 29/06* (2006.01)
*G06F 21/53* (2013.01)
(Continued)

(52) U.S. Cl.
CPC ............ *H04L 63/0853* (2013.01); *G06F 21/53* (2013.01); *H04L 12/2814* (2013.01);
(Continued)

(58) Field of Classification Search
CPC ....... G06F 21/121; G06F 21/30; G06F 21/53; H04L 63/0853; H04L 63/83
See application file for complete search history.

(56) References Cited

U.S. PATENT DOCUMENTS

2003/0225890 A1\* 12/2003 Dunstan et al. ............... 709/227
2004/0053645 A1  3/2004 Brignone et al.
(Continued)

FOREIGN PATENT DOCUMENTS

CN  101128065 A  2/2008
CN  101218790 A  7/2008
(Continued)

OTHER PUBLICATIONS

Ma et al., "Code Migration Strategy in Mobile Agent System," vol. 23, No. 4, China Academic Journal Electronic Publishing House (Oct. 2006).

(Continued)

*Primary Examiner* — Edward Zee
(74) *Attorney, Agent, or Firm* — Leydig, Voit & Mayer, Ltd.

(57) ABSTRACT

The present disclosure provides a smart space access method, a system, a controller, and a smart space interface server. The smart space access method includes: determining, by a controller that the controller enters a smart space in a smart space list; receiving a main mobile code corresponding to the smart space; and loading and executing the main mobile code, displaying a main service interface, generating a smart space request according to a service number of a selected application, sending the smart space request to the interface server, executing a result mobile code sent by the interface server, and displaying a processing result of the selected application. According to the present disclosure, access to different smart applications in different smart spaces can be implemented in a uniform manner by using a single controller without preinstalling a control program of a smart space, thereby providing a good expansibility.

12 Claims, 10 Drawing Sheets

(51) Int. Cl.
*H04L 12/28* (2006.01)
*H04W 4/00* (2009.01)
*H04L 29/08* (2006.01)
*H04W 4/02* (2009.01)

(52) U.S. Cl.
CPC .............. *H04L63/083* (2013.01); *H04L 67/04* (2013.01); *H04L 67/34* (2013.01); *H04W 4/001* (2013.01); *H04L 67/18* (2013.01); *H04W 4/02* (2013.01)

(56) References Cited

U.S. PATENT DOCUMENTS

| | | | |
|---|---|---|---|
| 2005/0071879 A1* | 3/2005 | Haldavnekar et al. | 725/81 |
| 2005/0184865 A1 | 8/2005 | Han | |
| 2008/0005679 A1 | 1/2008 | Rimas-Ribikauskas et al. | |
| 2008/0209034 A1 | 8/2008 | Shin et al. | |
| 2010/0100620 A1 | 4/2010 | Sathish | |
| 2010/0283613 A1* | 11/2010 | Palin | H04L 12/2809 340/572.1 |

FOREIGN PATENT DOCUMENTS

| | | |
|---|---|---|
| EP | 2171620 | 4/2010 |
| WO | WO 2009013385 A1 | 1/2009 |

OTHER PUBLICATIONS

Ming et al., "Research on System Software of Trusted Smart Space Based on SOA," vol. 37, No. 1, *Computer Science*, China Academic Journal Electronic Publishing House (Jan. 2010).

Sathish et al., "Supporting Smart Space Infrastructures: A Dynamic Context-Model Composition Framework," Mobimedia'07, 7th Internaion ICST Conference on Mobile Media Communications, Aitolokarnania, Greece (Aug. 2007).

* cited by examiner

# SMART SPACE ACCESS METHOD, SYSTEM, CONTROLLER, AND SMART SPACE INTERFACE SERVER

CROSS-REFERENCE TO RELATED APPLICATIONS

This application is a continuation of International Patent Application No. PCT/CN2012/080158, filed on Aug. 15, 2012, which claims priority to Chinese Patent Application No. 201110232473.0, filed on Aug. 15, 2011, both of which are hereby incorporated by reference in their entireties.

TECHNICAL FIELD

Embodiments of the present disclosure relate to the field of communications technologies and, in particular, to a smart space access method, a system, a controller, and a smart space interface server.

BACKGROUND

A smart space is a working space in which a calculating and information device and a multi-type sensing apparatus are embedded. An objective of the smart space is to allow a user to obtain various smart applications in the smart space in an extremely convenient manner, thereby efficiently performing separate work and work cooperated with another person. For example, the smart space may be a smart home, a smart classroom, a smart conference room, and the like. A controller is a mobile control terminal provided for the user to use a smart application in the smart space. Generally, the controller only has limited power and provides a relatively weak calculating capability, storage capability, and communications capability.

A smart society is a development trend of a smart space. In a smart society, multiple different smart spaces exist, and a controller, generally used as a device for a user to interact with a smart space, needs to enter and exit different smart spaces. Each smart space provides different application services, and each smart space also provides different operations, interfaces, and the like for a user. In consideration of function integrity and a human-centered service, after a user enters a work scope of a smart space, the smart space should display application information provided by the smart space on the controller in a user interface manner for the user to browse, so that the user understands content of an application and selects an application required by the user. After receiving an operation instruction of the controller, the smart space performs relevant calculation processing to provide an intelligent service for the user.

In the prior art, an interaction procedure between a controller and a smart space in this single smart space is as follows: a control program is preinstalled in the controller, and a user obtains various smart applications provided in the smart space by manipulating the controller. For a smart society, different smart spaces provide different application services, and different smart spaces also provide different operations and interfaces for a user. Therefore, in different smart spaces, a user needs to use different controllers to perform an interaction.

As a smart society is implemented in the future and various smart spaces are widely used, a user enters and exits different smart spaces frequently in a wide area range in real life and may access many smart spaces for only one time. However, it is difficult for a user to simultaneously own and carry controllers corresponding to all smart spaces, it is also difficult to preinstall control programs of all smart spaces in one controller, and no corresponding solution is provided for this case in the prior art.

SUMMARY

Embodiments of the present disclosure provide a smart space access method, a system, a controller, and a smart space interface server to implement access to different smart applications in different smart spaces in a uniform manner by using a single controller.

An embodiment of the present disclosure provides a smart space access method, including:

determining, by a controller, that the controller enters a smart space in a smart space list stored by the controller based on an obtained smart space number and current location information of the controller, where the smart space corresponds to the smart space number;

receiving, by the controller, a main mobile code that is sent by an interface server of the smart space and corresponds to the smart space;

loading and executing, by the controller, the main mobile code, displaying a main service interface of the smart space;

generating, by the controller, a smart space request according to a service number of a selected application that is selected by a user;

sending, by the controller, the smart space request to the interface server of the smart space;

receiving, loading, and executing, by the controller, a result mobile code sent by the interface server of the smart space; and displaying a processing result of the selected application.

An embodiment of the present disclosure further provides a smart space access method, including:

sending, by an interface server of a smart space, a main mobile code corresponding to the smart space to a controller that enters the smart space, wherein the controller displays a main service interface of the smart space after loading and executing the main mobile code;

receiving, by the interface server of the smart space, a smart space request sent by the controller, where the smart space request carries a service number of an application selected by the controller; and sending, by the interface server of the smart space, a result mobile code to the controller according to the service number, so that the controller displays, after loading and executing the result mobile code, a processing result of the application selected by the controller.

An embodiment of the present disclosure further provides a controller, including:

a determining module, configured to determine, according to an obtained smart space number and current location information of the controller, that the controller enters a smart space in a smart space list stored by the controller, where the smart space corresponds to the smart space number;

a receiving module, configured to receive a main mobile code that is sent by an interface server of the smart space and corresponds to the smart space, and receive a result mobile code sent by the interface server of the smart space;

an executing module, configured to load and execute the main mobile code received by the receiving module, and load and execute the result mobile code that is sent by the interface server of the smart space and received by the receiving module;

a displaying module, configured to display a main service interface of the smart space after the executing module loads and executes the main mobile code, and display a processing result of a selected application that is selected by a user after the executing module loads and executes the result mobile code;

a generating module, configured to generate a smart space request according to a service number of the selected application; and a sending module, configured to send the smart space request generated by the generating module to the interface server of the smart space.

An embodiment of the present disclosure further provides a smart space interface server, including a code sending module and a request receiving module, where:

the code sending module is configured to send a main mobile code corresponding to a smart space to a controller that enters the smart space to which the smart space interface server belongs, wherein the controller displays a main service interface of the smart space after loading and executing the main mobile code; and send a result mobile code to the controller according to a service number received by the request receiving module, so that the controller displays, after loading and executing the result mobile code, a processing result of an application selected by the controller; and the request receiving module is configured to receive a smart space request sent by the controller, where the smart space request carries a service number of the application selected by the controller.

An embodiment of the present disclosure further provides a smart space system, including the preceding smart space interface server and at least one function server.

An embodiment of the present disclosure further provides a smart space access system, including the preceding controller and the preceding smart space system.

According to the embodiments of the present disclosure, after a controller determines, according to an obtained smart space number and current location information, that the controller enters a smart space in a smart space list stored by the controller, where the smart space corresponds to the smart space number, the controller receives a main mobile code that is sent by an interface server of the smart space and corresponds to the smart space; then, the controller loads and executes the main mobile code, displays a main service interface of the smart space, generates a smart space request according to a service number of a selected application, and sends the smart space request to the interface server of the smart space; finally, the controller receives, loads, and executes a result mobile code sent by the interface server of the smart space and displays a processing result of the selected application. In the embodiments of the present disclosure, a controller does not need to preload a main mobile code of a smart space; on the contrary, the controller receives and loads the main mobile code of the smart space after entering the smart space; then the controller is capable of accessing different applications in the smart space. Therefore, according to the embodiments of the present disclosure, access to different smart applications in different smart spaces can be implemented in a uniform manner by using a single controller without preinstalling a control program of a smart space, thereby providing a good expansibility.

BRIEF DESCRIPTION OF DRAWINGS

To describe the technical solutions in the embodiments of the present disclosure or in the prior art more clearly, the following briefly introduces the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure more comprehensible, the following clearly and describes the technical solutions in the embodiments of the present disclosure with reference to the accompanying drawings in the embodiments of the present disclosure. The described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
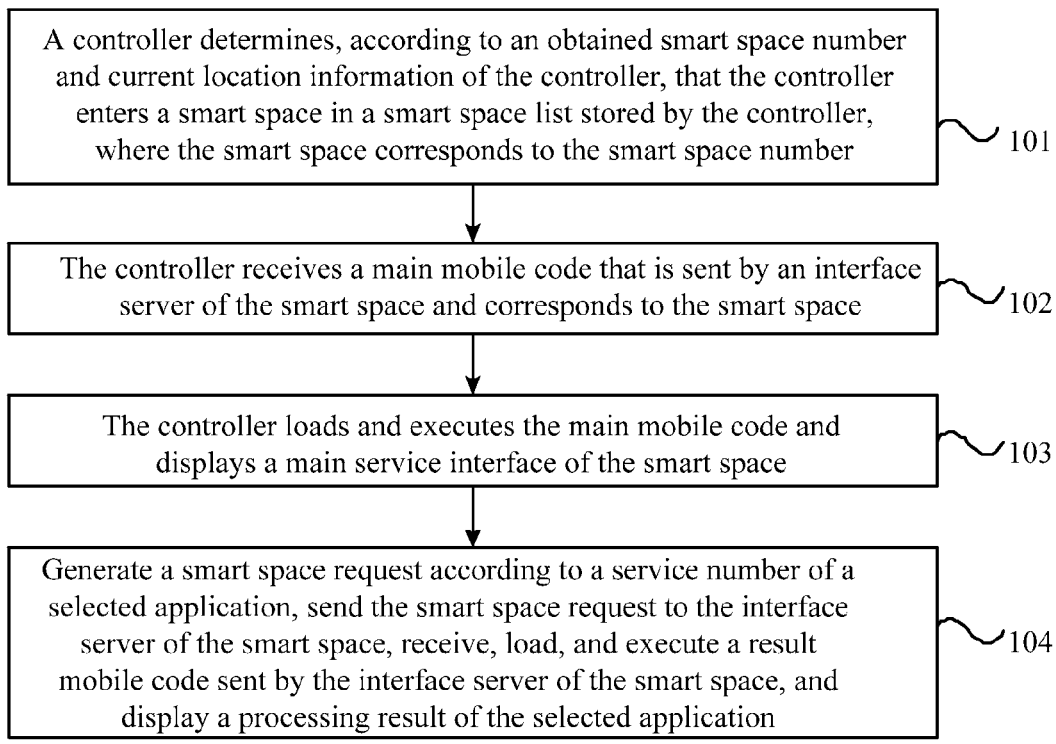
FIG. 1 is a flowchart of a smart space access method according to an embodiment of the present disclosure.

FIG. 1 is a flowchart of a smart space access method according to an embodiment of the present disclosure. As shown in FIG. 1, the smart space access method may include:

Step 101: A controller determines, according to an obtained smart space number and current location information of the controller, that the controller enters a smart space in a smart space list stored by the controller, where the smart space corresponds to the smart space number.

Step 102: The controller receives a main mobile code that is sent by an interface server of the smart space and corresponds to the smart space.

In this embodiment, before the controller receives the main mobile code that is sent by the interface server of the smart space and corresponds to the smart space, the controller may first acquire a service password of the smart space from the smart space list and establish a communication connection to the interface server of the smart space according to the service password. In this case, after the interface server of the smart space determines the access right of the controller according to a physical address of the controller, the controller may receive the main mobile code that is sent by the interface server of the smart space according to an access right of the controller and corresponds to the smart space.

In this embodiment, the communication connection established between the controller and the interface server of the smart space may be a radio communication connection or a short-range radio communication connection, and a form of establishing the communication connection between the controller and the interface server of the smart space is not limited in this embodiment, as long as the controller is capable of communicating with the interface server of the smart space by using the established communication connection.

In this embodiment, the physical address of the controller may be a media access control (Media Access Control, "MAC" for short) address of the controller.

Step 103: The controller loads and executes the main mobile code and displays a main service interface of the smart space.

In this embodiment, after the main service interface of the smart space is displayed, if indication information indicating that the controller exits the smart space is received, then the controller disconnects the communication connection to the smart space and deletes the main mobile code sent by the interface server of the smart space.

Step 104: Generate a smart space request according to a service number of a selected application, send the smart space request to the interface server of the smart space, receive, load, and execute a result mobile code sent by the interface server of the smart space, and display a processing result of the selected application.

In this embodiment, if the access right of the controller is an unauthorized user, then the controller displays a service reject prompt after the controller loads and executes the main mobile code.

In some embodiments, before step 101, the controller may establish, according to a smart space number of an obtained list acquiring smart space, a communication connection to the list acquiring smart space and receive a main mobile code that is sent by an interface server of the list acquiring smart space and corresponds to the list acquiring smart space. The controller loads and executes the main mobile code corresponding to the list acquiring smart space, displays at least one smart space list that can be acquired by the controller, generates a smart space list acquiring request according to a selected smart space list, and sends the smart space list acquiring request to the interface server of the list acquiring smart space; and then, the controller receives, loads, and executes a result mobile code sent by the interface server of the list acquiring smart space, acquires and stores a smart space list encapsulated in the result mobile code sent by the interface server of the list acquiring smart space, where a smart space number, location information, and a service password of at least one smart space in a wide area range are stored in the smart space list.

The result mobile code sent by the interface server of the list acquiring smart space is the result mobile code that is encapsulated from a smart space list to which a service password is added and then sent by the interface server of the list acquiring smart space to the controller after the interface server of the list acquiring smart space sends the smart space list acquiring request to a list generating server of the list acquiring smart space and the list generating server adds, according to the physical address of the controller, the service password of a smart space that complies with a predetermined policy to the selected smart space list.

In this embodiment, after a controller determines, according to an obtained smart space number and current location information, that the controller enters a smart space in a smart space list stored by the controller, where the smart space corresponds to the smart space number, the controller receives a main mobile code that is sent by an interface server of the smart space and corresponds to the smart space. Then, the controller loads and executes the main mobile code, displays a main service interface of the smart space, generates a smart space request according to a service number of a selected application, and sends the smart space request to the interface server of the smart space. Then, the controller receives, loads, and executes a result mobile code sent by the interface server of the smart space and displays a processing result of the selected application. In this embodiment, a controller does not need to preload a main mobile code of a smart space; on the contrary, the controller receives and loads the main mobile code of the smart space after entering the smart space; then the controller is capable of accessing different applications in the smart space. Therefore, according to this embodiment, access to different smart applications in different smart spaces can be implemented in a uniform manner by using a single controller without preinstalling a control program of a smart space, thereby providing a good expansibility.

Figure 2:
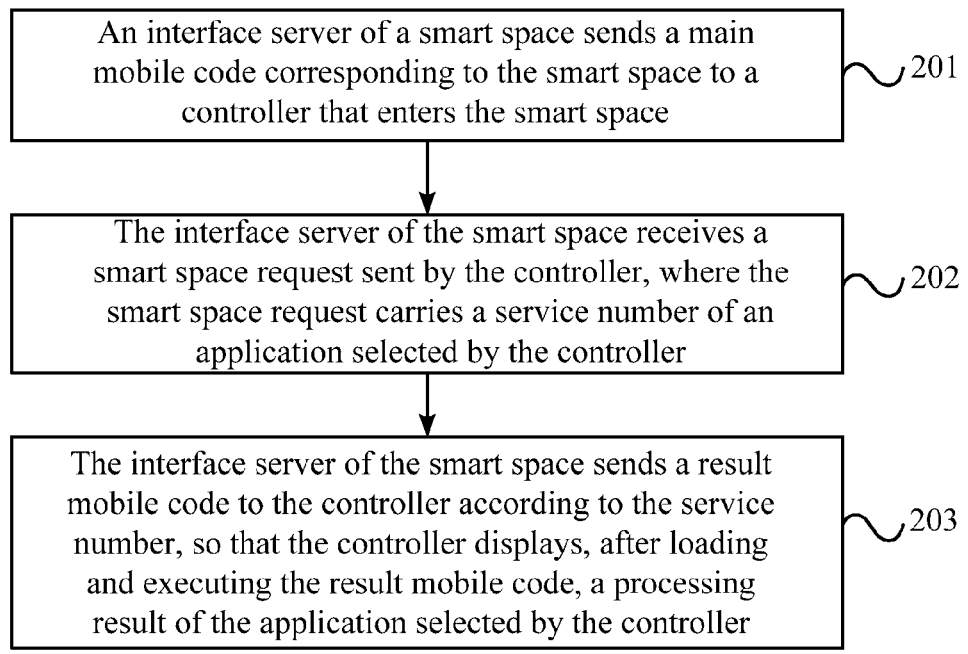
FIG. 2 is a flowchart of a smart space access method according to another embodiment of the present disclosure.

FIG. 2 is a flowchart of a smart space access method according to another embodiment of the present disclosure. As shown in FIG. 2, the smart space access method may include:

Step 201: An interface server of a smart space sends a main mobile code corresponding to the smart space to a controller that enters the smart space, so that the controller displays a main service interface of the smart space after loading and executing the main mobile code.

In one embodiment, the interface server of the smart space determines an access right of the controller according to a physical address of the controller and sends, according to the access right of the controller, the main mobile code corresponding to the smart space to the controller.

Step 202: The interface server of the smart space receives a smart space request sent by the controller, where the smart space request carries a service number of an application selected by the controller.

Step 203: The interface server of the smart space sends a result mobile code to the controller according to the service number, so that the controller displays, after loading and executing the result mobile code, a processing result of the application selected by the controller.

Further, before the interface server of the smart space sends the result mobile code to the controller according to the service number, the interface server of the smart space may further retrieve, according to a main service number corresponding to the service number, a service list stored by the interface server and obtain a function server address corresponding to the main service number. The interface server of the smart space sends, according to the function server address, the smart space request to a function server corresponding to the main service number, and receives a processing result of the smart space request, where the processing result is sent by the function server.

Then, the interface server of the smart space may generate a result mobile code according to the processing result and the service number and send the result mobile code to the controller.

In this embodiment, an interface server of a smart space sends a main mobile code corresponding to the smart space to a controller that enters the smart space, and sends, after receiving the smart space request sent by the controller, a result mobile code to the controller according to a service number carried in a smart space request, so that the controller displays, after loading and executing the result mobile code, a processing result of an application selected by the controller. In this embodiment, a controller does not need to preload a main mobile code of a smart space; on the contrary, the controller receives and loads the main mobile code of the smart space after entering the smart space; then the controller is capable of accessing different applications in the smart space. Therefore, according to this embodiment, access to different smart applications in different smart spaces can be implemented in a uniform manner by using a single controller without preinstalling a control program of a smart space, thereby providing a good expansibility.

Figure 3A:
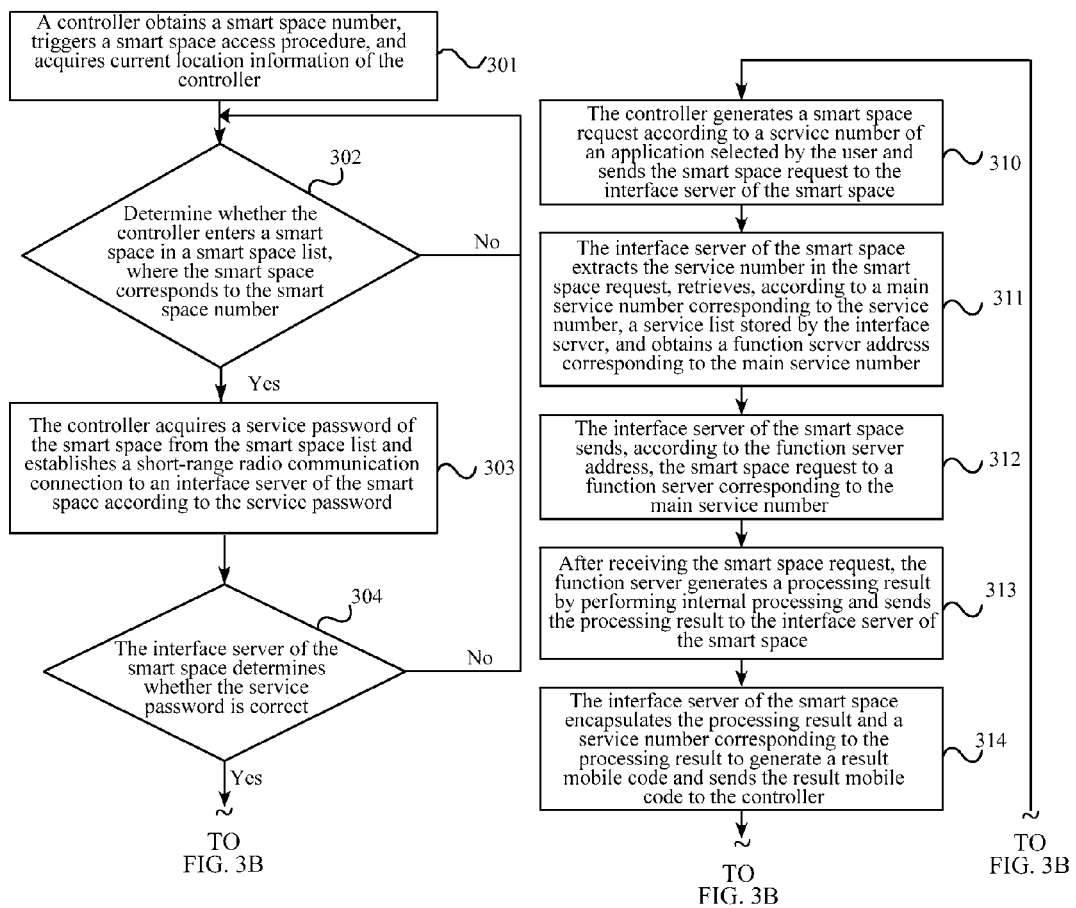
FIG. 3A and FIG. 3B is a flowchart of a smart space access method according to still another embodiment of the present disclosure.
Figure 3B:
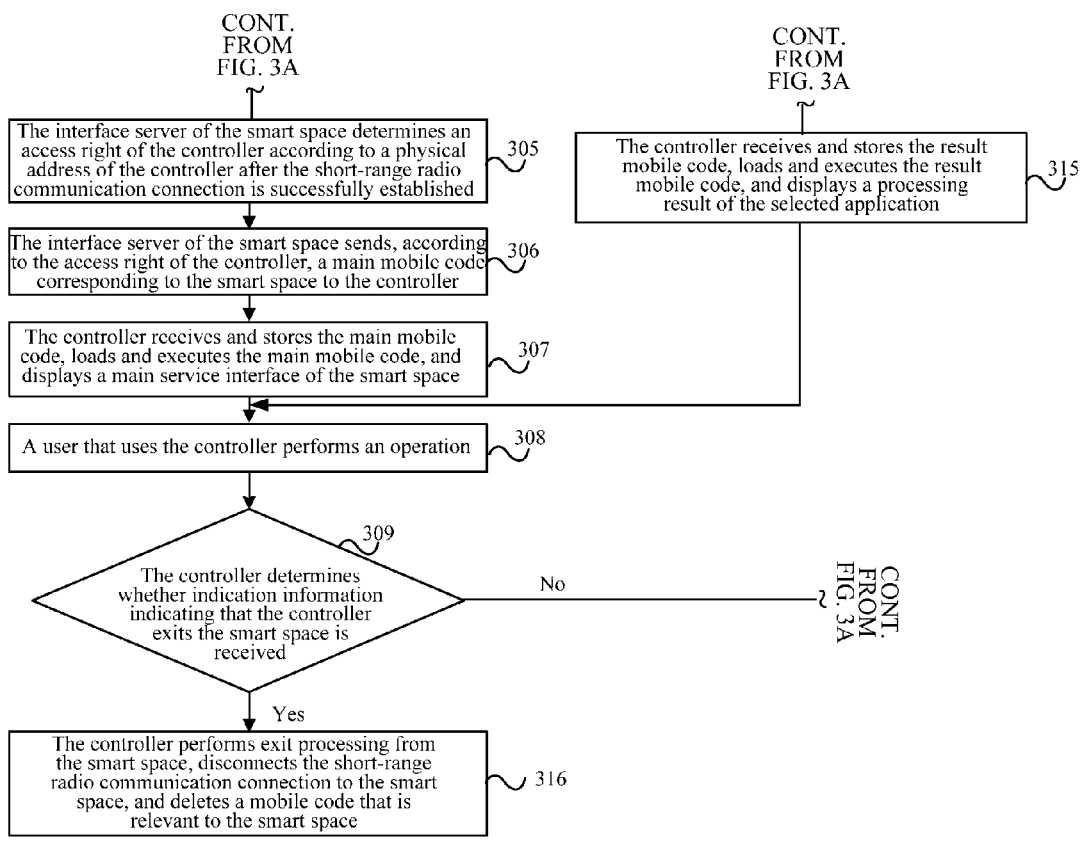

FIGS. 3A-3B show a flowchart of a smart space access method according to still another embodiment of the present disclosure. As shown in FIGS. 3A-3B, the smart space access method may include:

Step 301: A controller obtains a smart space number, triggers a smart space access procedure, and acquires current location information of the controller.

In some embodiments, the controller may obtain the smart space number by radio frequency identification (Radio Frequency Identification, "RFID" for short) label scanning, smart card reading, or direct manual input. The foregoing merely describes several examples for obtaining a smart space number. However, this embodiment is not merely limited thereto, and the manner for obtaining a smart space number by a controller is not limited in this embodiment.

In some embodiments, the controller may acquire the current location information of the controller by using a particular positioning device, such as a global positioning system (Global Positioning System, GPS for short), or a sensor.

Step 302: The controller retrieves, according to the smart space number and the current location information, a smart space list stored in the controller and determines whether the controller enters a smart space in the smart space list, where the smart space corresponds to the smart space number. If yes, perform step 303. If it is determined that the controller does not enter the smart space in the smart space list, where the smart space corresponds to the smart space number, return to perform step 302.

In this embodiment, a smart space number, location information, and a service password of at least one smart space in a wide area range are stored in the smart space list, and the smart space list is pre-stored in the controller and updated over time.

Step 303: The controller acquires a service password of the smart space from the smart space list and establishes a short-range radio communication connection to an interface server of the smart space according to the service password.

Step 304: The interface server of the smart space determines whether the service password is correct. If the service password is correct, the interface server of the smart space establishes the short-range radio communication connection to the controller, and perform step 305 (shown on FIG. 3b). If, at step 304, the interface server of the smart space determines that the service password is not correct, return to perform step 302.

Step 305: The interface server of the smart space determines an access right of the controller according to a physical address of the controller after the short-range radio communication connection is successfully established.

In this embodiment, the physical address of the controller may be a MAC address of the controller. The access right of the controller may be a superuser, a common user, an unauthorized user, or the like. In some embodiments, the interface server of the smart space may store two access right lists, and a MAC address of a controller whose access right is a superuser and a MAC address of a controller whose access right is an unauthorized user are separately stored in the two access right lists. In this case, after establishing the short-range radio communication connection to the controller, the interface server of the smart space may separately search the two access right lists according to the MAC address of the controller. If the MAC address of the controller exists in the list where a MAC address of a controller whose access right is a superuser is stored, it may be determined that the access right of the controller is a superuser. Similarly, if the MAC address of the controller exists in the list where a MAC address of a controller whose access right is an unauthorized user is stored, it may be determined that the access right of the controller is an unauthorized user. If the MAC address of the controller is not found in both the two access right lists, it may be determined that the access right of the controller is a common user.

Step 306: The interface server of the smart space sends, according to the access right of the controller, a main mobile code corresponding to the smart space to the controller.

The main mobile code corresponding to the smart space is used to display on the controller a main service interface of all applications that can be provided by the smart space or is used to display a service reject prompt.

Step 307: The controller receives and stores the main mobile code, loads and executes the main mobile code, and displays a main service interface of the smart space.

In this embodiment, if the access right of the controller is an unauthorized user, the controller displays a service reject prompt after loading and executing the main mobile code.

Step 308: A user that uses the controller performs an operation.

In some embodiments, the user that uses the controller may select an application provided by the smart space by using the main service interface of the smart space, may perform a selection to allow the controller to exit the smart space, or may perform a subsequent operation for a returned processing result, and so on.

Step 309: The controller determines whether indication information indicating that the controller exits the smart space is received. If yes, perform step 316. If no indication information indicating that the controller exits the smart space is received, perform step 310 (shown on FIG. 3A).

In this embodiment, if the user that uses the controller performs a selection to allow the controller to exit the smart space in step 308, the controller receives the indication information indicating that the controller exits the smart space, and then step 316 is performed. If the user that uses the controller selects an application provided by the smart space in step 308, the controller receives no indication information indicating that the controller exits the smart space, and subsequently, step 310 is performed.

Step 310: The controller generates a smart space request according to a service number of an application selected by the user and sends the smart space request to the interface server of the smart space.

The smart space request includes the service number of the selected application.

Step 311: The interface server of the smart space extracts the service number in the smart space request, retrieves, according to a main service number corresponding to the service number, a service list stored by the interface server, and obtains a function server address corresponding to the main service number.

In this embodiment, the main service number is used to identify a function server, which provides a particular application, in the smart space. The service number is used to identify the particular application provided by the function server.

Information such as the address of the function server in the smart space and the main service number is recorded in the service list stored by the interface server.

Step 312: The interface server of the smart space sends, according to the function server address, the smart space request to a function server corresponding to the main service number.

Step 313: After receiving the smart space request, the function server generates a processing result by performing internal processing and sends the processing result to the interface server of the smart space.

For example, the processing result may be an operation interface for providing a subsequent operation.

Step 314: The interface server of the smart space encapsulates the processing result and a service number corresponding to the processing result to generate a result mobile code and sends the result mobile code to the controller. From step 314, the method proceeds to step 315, shown in FIG. 3B.

Step 315: The controller receives and stores the result mobile code, loads and executes the result mobile code, and displays a processing result of the selected application. From step 315, the method proceeds to step 308.

Step 316: The controller performs exit processing from the smart space, disconnects the short-range radio communication connection to the smart space, and deletes a mobile code that is relevant to the smart space.

The mobile code that is relevant to the smart space includes at least the main mobile code corresponding to the smart space.

According to this embodiment, access to different smart applications in different smart spaces can be implemented in a uniform manner by using a single controller without preinstalling a control program of a smart space, thereby providing a good expansibility.

In this embodiment of the present disclosure, before accessing a smart space, a controller acquires a smart space list that includes relevant information of the smart space.

Figure 4A:
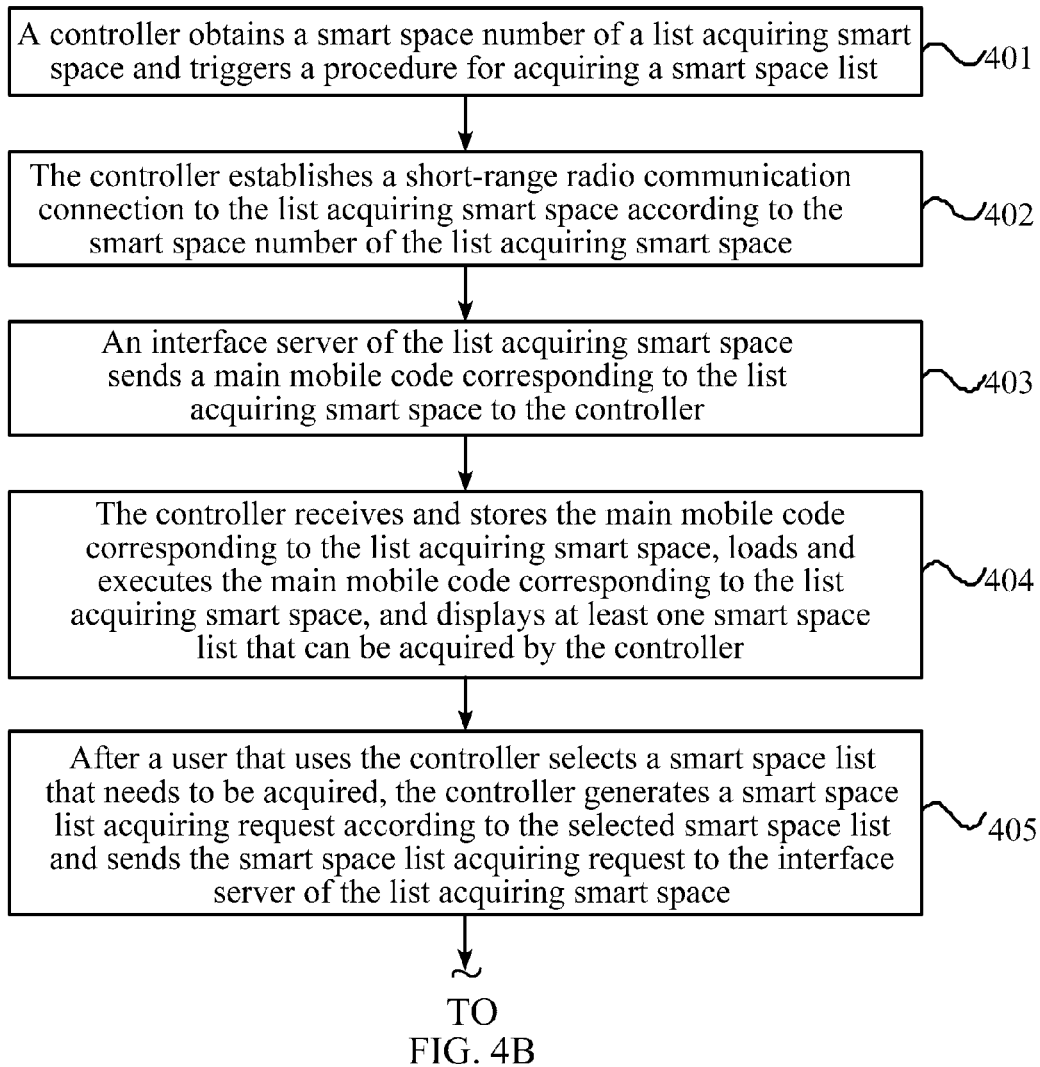
FIG. 4A and FIG. 4B is a flowchart of acquiring a smart space list according to an embodiment of the present disclosure.
Figure 4B:
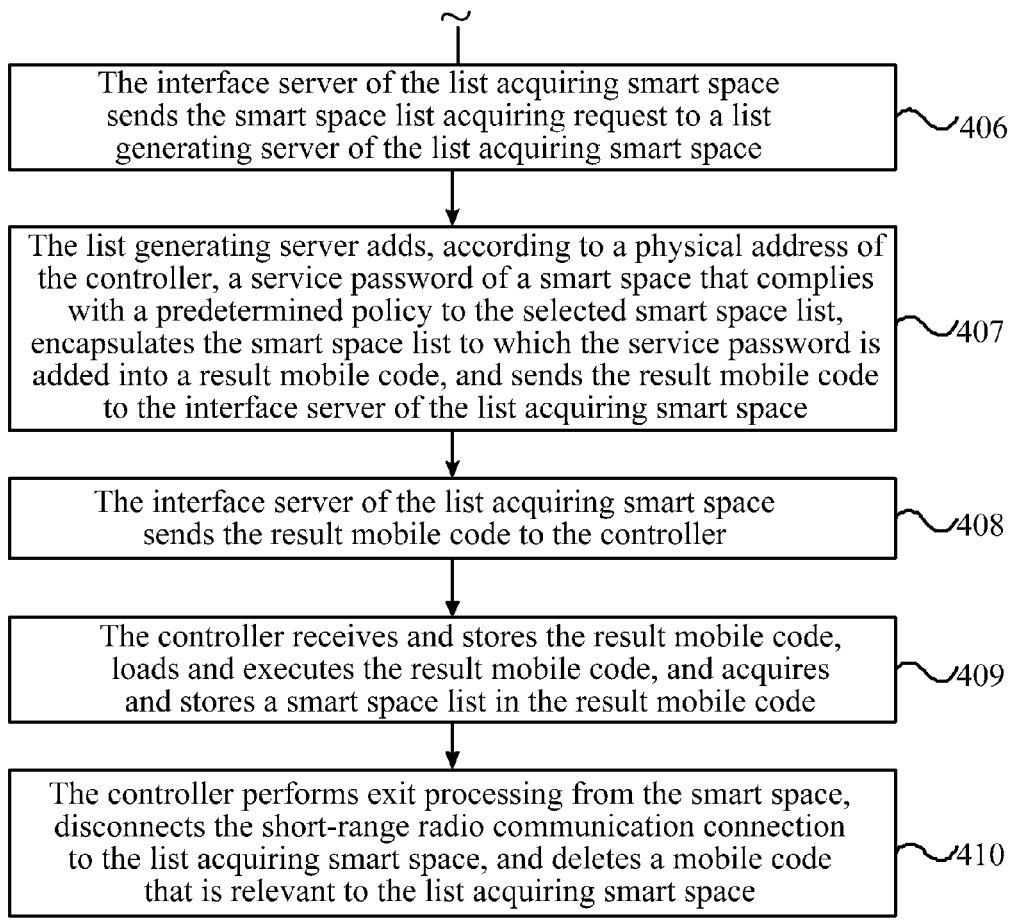

FIGS. 4A-4B show a flowchart of acquiring a smart space list according to an embodiment of the present disclosure. As shown in FIGS. 4A-4B, the method may include:

Step 401: A controller obtains a smart space number of a list acquiring smart space and triggers a procedure for acquiring a smart space list.

In some embodiments, the controller may obtain the smart space number of the list acquiring smart space by RFID label scanning, smart card reading, or direct manual input. The foregoing merely describes several examples for obtaining a smart space number of a list acquiring smart space. However, this embodiment is not merely limited thereto, and the manner for obtaining a smart space number of a list acquiring smart space by the controller is not limited in this embodiment.

Step 402: The controller establishes a short-range radio communication connection to the list acquiring smart space according to the smart space number of the list acquiring smart space.

Step 403: An interface server of the list acquiring smart space sends a main mobile code corresponding to the list acquiring smart space to the controller.

In this embodiment, the main mobile code corresponding to the list acquiring smart space is used to display on the controller at least one smart space list that can be acquired by the controller, where the smart space list is generally classified according to a certain rule. For example, the smart space list may be classified according to a particular area or a particular industry.

Step 404: The controller receives and stores the main mobile code corresponding to the list acquiring smart space, loads and executes the main mobile code corresponding to the list acquiring smart space, and displays at least one smart space list that can be acquired by the controller.

Step 405: After a user that uses the controller selects a smart space list that needs to be acquired, the controller generates a smart space list acquiring request according to the selected smart space list and sends the smart space list acquiring request to the interface server of the list acquiring smart space. From step 405, the method proceeds to step 406, shown on FIG. 4B.

Step 406: The interface server of the list acquiring smart space sends the smart space list acquiring request to a list generating server of the list acquiring smart space.

Step 407: The list generating server adds, according to a physical address of the controller, a service password of a smart space that complies with a predetermined policy to the selected smart space list, encapsulates the smart space list to which the service password is added into a result mobile code, and sends the result mobile code to the interface server of the list acquiring smart space.

Step 408: The interface server of the list acquiring smart space sends the result mobile code to the controller.

Step 409: The controller receives and stores the result mobile code, loads and executes the result mobile code, and acquires and stores a smart space list in the result mobile code.

Step 410: The controller performs exit processing from the smart space, disconnects the short-range radio communication connection to the list acquiring smart space, and deletes a mobile code that is relevant to the list acquiring smart space.

In addition, in this embodiment, if no service password exists in the smart space list acquired by the controller from the list acquiring smart space, the controller may also obtain a service password in other manners, for example, the controller directly applies to an administrator of each smart space stored in the smart space list for a service password, and then the applied service password is manually input and stored in the smart space list.

As a smart society is adopted and various smart spaces are widely used, a user enters and exits different smart spaces frequently in a wide area range in real life and may access many smart spaces for only one time. According to the smart space access methods provided in the embodiments of the present disclosure, access to different smart applications in different smart spaces can be implemented in a uniform manner by using a single controller without preloading a main mobile code of a smart space, thereby providing a good expansibility, applying to a dynamic smart space, and providing an obvious advantage over the prior art.

According to various embodiments, all or a part of the steps in the method embodiments may be implemented by a program instructing relevant hardware. The program may be stored in a computer readable storage medium. When the program is executed by a processor, the steps in the method embodiments are performed. The storage medium may be any medium that is capable of storing program codes, such as a ROM (read-only memory), a RAM (random-access memory), a magnetic disk, or an optical disk.

Figure 5:
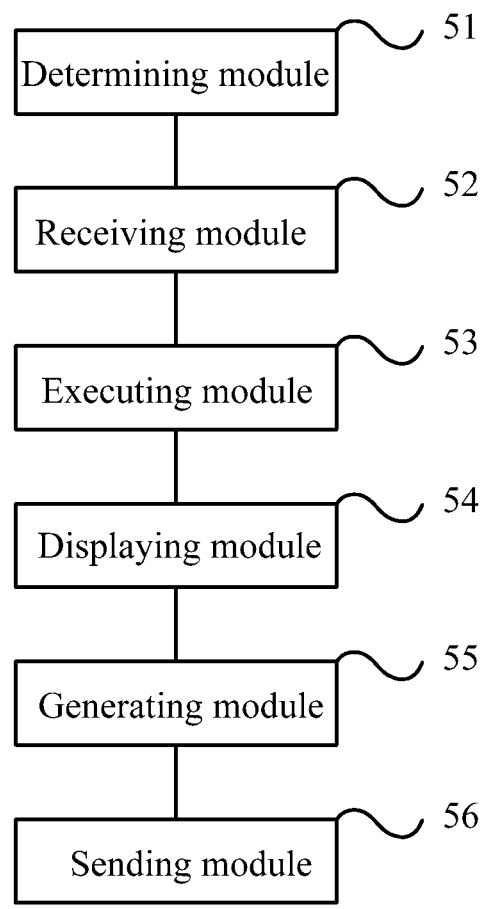
FIG. 5 is a schematic structural diagram of a controller according to an embodiment of the present disclosure.

FIG. 5 is a schematic structural diagram of a controller according to an embodiment of the present disclosure. The controller in this embodiment is capable of implementing the method in the embodiment shown in FIG. 1 in the present disclosure. As shown in FIG. 5, the controller may include:

a determining module 51, configured to determine, according to an obtained smart space number and current location information of the controller, that the controller enters a smart space in a smart space list stored by the controller, where the smart space corresponds to the smart space number;

a receiving module 52, configured to receive a main mobile code that is sent by an interface server of the smart space and corresponds to the smart space, and receive a result mobile code sent by the interface server of the smart space;

an executing module 53, configured to load and execute the main mobile code received by the receiving module 52, and load and execute the result mobile code that is sent by the interface server of the smart space and received by the receiving module 52;

a displaying module 54, configured to display a main service interface of the smart space after the executing module 53 loads and executes the main mobile code, and display a processing result of a selected application after the executing module 53 loads and executes the result mobile code;

a generating module 55, configured to generate a smart space request according to a service number of the selected application; and a sending module 56, configured to send the smart space request generated by the generating module 55 to the interface server of the smart space.

In this embodiment, after the determining module 51 determines, according to an obtained smart space number and current location information, that the controller enters a smart space in a smart space list stored by the controller, where the smart space corresponds to the smart space number, the receiving module 52 receives a main mobile code that is sent by an interface server of the smart space and corresponds to the smart space. Then, the executing module 53 loads and executes the main mobile code, the displaying module 54 displays a main service interface of the smart space, the generating module 55 generates a smart space request according to a service number of an application that is selected by using the main service interface, and the sending module 56 sends the smart space request to the interface server of the smart space. Then, the receiving module 52 receives a result mobile code sent by the interface server of the smart space, the executing module 53 loads and executes the result mobile code sent by the interface server of the smart space, and then the displaying module 54 displays a processing result of the selected application. The controller does not need to preload a main mobile code of a smart space; on the contrary, the receiving module 52 receives the main mobile code of the smart space after the controller enters the smart space, and the executing module 53 loads the main mobile code of the smart space, then the controller is capable of accessing different applications in the smart space. Therefore, access to different smart applications in different smart spaces can be implemented in a uniform manner by using a single controller without preinstalling a control program of a smart space, thereby providing a good expansibility.

Figure 6:
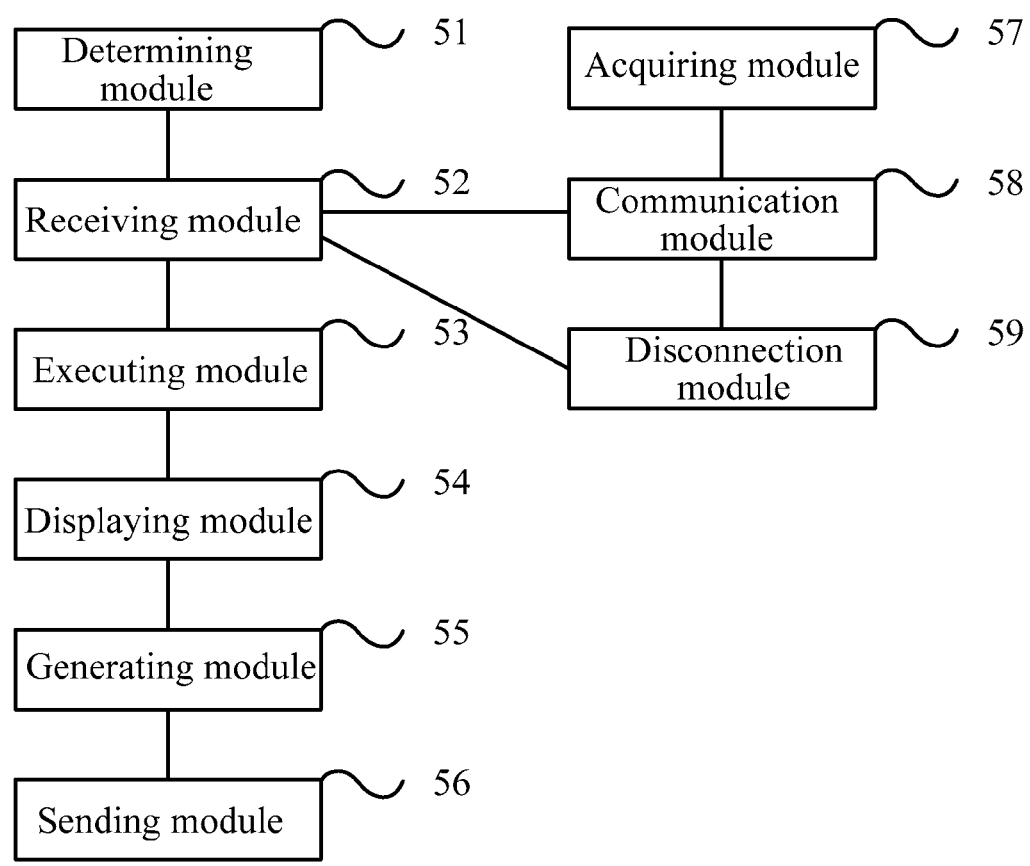
FIG. 6 is a schematic structural diagram of a controller according to another embodiment of the present disclosure.

FIG. 6 is a schematic structural diagram of a controller according to another embodiment of the present disclosure. Compared with the controller shown in FIG. 5, a difference lies in that the controller shown in FIG. 6 may also include:

an acquiring module 57, configured to acquire a service password of the smart space from the smart space list; and a communication module 58, configured to establish a communication connection to the interface server of the smart space according to the service password acquired by the acquiring module 57.

In this embodiment, the receiving module 52 may receive a main mobile code that is sent by the interface server of the smart space according to an access right of the controller and corresponds to the smart space after the interface server of the smart space determines the access right of the controller according to a physical address of the controller.

Further, the displaying module 54 may further display a service reject prompt when the access right of the controller is an unauthorized user and after the executing module 53 loads and executes the main mobile code.

The controller in this embodiment may further include:

a disconnection module 59, configured to: after the receiving module 52 receives indication information indicating that the controller exits the smart space, disconnect the communication connection to the smart space and delete the main mobile code sent by the interface server of the smart space.

In this embodiment, further, the communication module 58 further establishes a communication connection to a list acquiring smart space according to an obtained smart space number of the list acquiring smart space.

The receiving module 52 may further receive a main mobile code that is sent by an interface server of the list acquiring smart space and corresponds to the list acquiring smart space, and receive a result mobile code sent by the interface server of the list acquiring smart space.

The executing module 53 may further load and execute the main mobile code that is received by the receiving module 52 and corresponds to the list acquiring smart space, and load and execute the result mobile code that is sent by the interface server of the list acquiring smart space and received by the receiving module 52.

The displaying module 54 may further display at least one smart space list that can be acquired by the controller.

The generating module 55 may further generate a smart space list acquiring request according to a selected smart space list.

The sending module 56 may further send the smart space list acquiring request to the interface server of the list acquiring smart space.

The acquiring module 57 may further acquire and store a smart space list encapsulated in the result mobile code sent by the interface server of the list acquiring smart space, where a smart space number, location information, and a service password of at least one smart space in a wide area range are stored in the smart space list.

According to the controller, access to different smart applications in different smart spaces can be implemented in a uniform manner by using a single controller without preinstalling a control program of a smart space, thereby providing a good expansibility.

Figure 7:
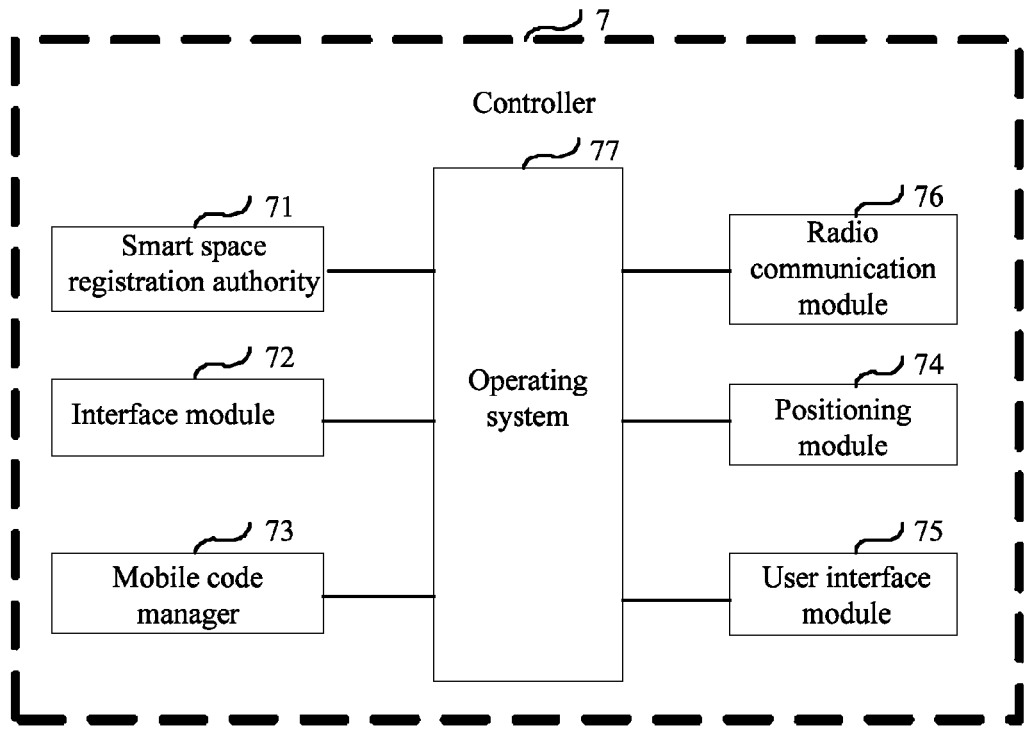
FIG. 7 is a schematic structural diagram of a controller according to still another embodiment of the present disclosure.

FIG. 7 is a schematic structural diagram of a controller according to still another embodiment of the present disclosure. As shown in FIG. 7, the controller 7 may include a smart space registration center 71, an interface module 72, a mobile code manager 73, a positioning module 74, a user interface module 75, and a radio communication module 76.

The smart space registration center 71 is configured to store a smart space number, location information, and a service password of at least one smart space in a wide area range in the form of a smart space list. The smart space number, the location information, and the service password of the at least one smart space can be updated over time. The smart space number is a local number and has no global significance. A smart space can only be determined according to the smart space number in combination with the location information. For example, the location information is a residential area, and the smart space numbers may be set by an administrator of the residential area to distinguish different smart spaces in the residential area. The service password is used to establish a radio communication connection between the controller 7 and the smart space.

The interface module 72 is configured to receive a mobile code sent by an interface server of a smart space and store the mobile code in the mobile code manager 73. In addition, the interface module 72 intercepts a user operation and sends, by using the radio communication module 76, a service number of an application selected by a user to the interface server of the smart space by using a smart space request. The service number is used to determine a particular application provided by a function server, and a main service number corresponding to the service number is used to identify the function server that is in the smart space and provides the particular application. The service number may also include some other information to be used by the function server. A service number of a smart space is predefined. The interface module 72 may implement the functions of the receiving module 52 and the sending module 56 in the embodiments shown in FIG. 5 and FIG. 6 in the present disclosure.

The mobile code manager 73 is configured to manage a mobile code of the controller 7, extract, load and execute the mobile code, and generate the smart space request according to the user operation. The mobile code manager 73 may further perform an operation such as storage, update, and/or deletion for the mobile code. A mobile code is a program that can be run on another host rather than an originating host. The program can be moved smoothly from a host to another host and be executed. The mobile code manager 73 may implement the functions of the executing module 53 and the generating module 55 in the embodiments shown in FIG. 5 and FIG. 6 in the present disclosure.

The positioning module 74 is configured to acquire location information of the controller 7 and retrieve, according to the location information in combination with the smart space number, the smart space list stored by the smart space registration center 71, and may determine whether the controller 7 enters a smart space that is stored in the smart space list and corresponds to the smart space number. That is, the location information of the controller 7 and the smart space number are matched with location information and a smart space number of at least one smart space in the smart space list stored by the smart space registration center 71 so as to determine whether the controller 7 enters a smart space. The positioning module 74 may acquire the location information by using a particular positioning device. In some embodiments, a GPS (global positioning system), a sensor, or the like may be used. For some smart spaces, the smart space number is input in the controller 7 by RFID label scanning or smart card reading. In this case, the positioning module 74 may further include a device such as a RFID reader or a card reader, which is configured to receive the smart space number. In combination with the smart space registration center 71, the positioning module 74 may implement the functions of the determining module 51 in the embodiments shown in FIG. 5 and FIG. 6 in the present disclosure.

The user interface module 75 includes a keyboard and a displaying unit. A user that uses the controller 7 may perform an input operation by using the keyboard, such as selecting an application provided by the smart space, performing a selection to allow the controller 7 to exit the smart space, or inputting a smart space number. The displaying unit may display a result of loading and executing the mobile code for the user. For example, the displaying unit displays a main service interface of the smart space or displays a processing result of the application selected by the user, and so on. The user interface module 75 may implement the functions of the displaying module 54 in the embodiments shown in FIG. 5 and FIG. 6 in the present disclosure.

The radio communication module 76 is configured to establish a radio communication connection to the interface server of the smart space according to a service password of the smart space. In some embodiments, a short-range radio communications technology such as the Bluetooth® may be used to establish a short-range radio communication connection to the interface server of the smart space. The radio communication module 76 may implement the function of the communication module 58 in the embodiment shown in FIG. 6 in the present disclosure.

In addition, in one implementation, to ensure that the modules run, the controller 7 may further include an operating system 77.

According to the controller, access to different smart applications in different smart spaces can be implemented in a uniform manner by using a single controller without preinstalling a control program of a smart space, thereby providing a good expansibility.

Figure 8:
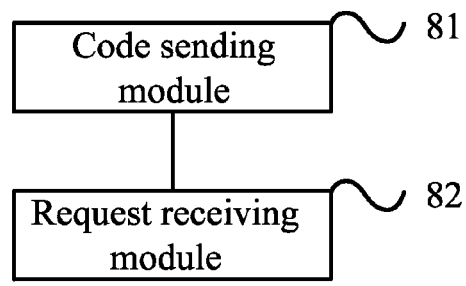
FIG. 8 is a schematic structural diagram of a smart space interface server according to an embodiment of the present disclosure.

FIG. 8 is a schematic structural diagram of a smart space interface server according to an embodiment of the present disclosure. The smart space interface server in this embodiment may implement the procedure in the embodiment shown in FIG. 2 in the present disclosure. As shown in FIG. 8, the smart space interface server may include a code sending module 81 and a request receiving module 82.

The code sending module 81 is configured to send a main mobile code corresponding to a smart space to a controller that enters the smart space to which the smart space interface server belongs, so that the controller displays a main service interface of the smart space after loading and executing the main mobile code; and send a result mobile code to the controller according to a service number received by the request receiving module 82, so that the controller displays, after loading and executing the result mobile code, a processing result of an application selected by the controller.

The request receiving module 82 is configured to receive a smart space request sent by the controller, where the smart space request carries a service number of the application selected by the controller.

The code sending module 81 may determine an access right of the controller according to a physical address of the controller and send, according to the access right of the controller, the main mobile code corresponding to the smart space to the controller.

In this embodiment, the code sending module 81 sends a main mobile code corresponding to a smart space to a controller that enters the smart space, and sends a result mobile code to the controller according to a service number carried in a smart space request after the request receiving module 82 receives the smart space request sent by the controller, so that the controller displays, after loading and executing the result mobile code, a processing result of an application selected by the controller. In this way, access to different smart applications in different smart spaces can be implemented in a uniform manner by using a single controller without preinstalling a control program of a smart space, thereby providing a good expansibility.

Figure 9:
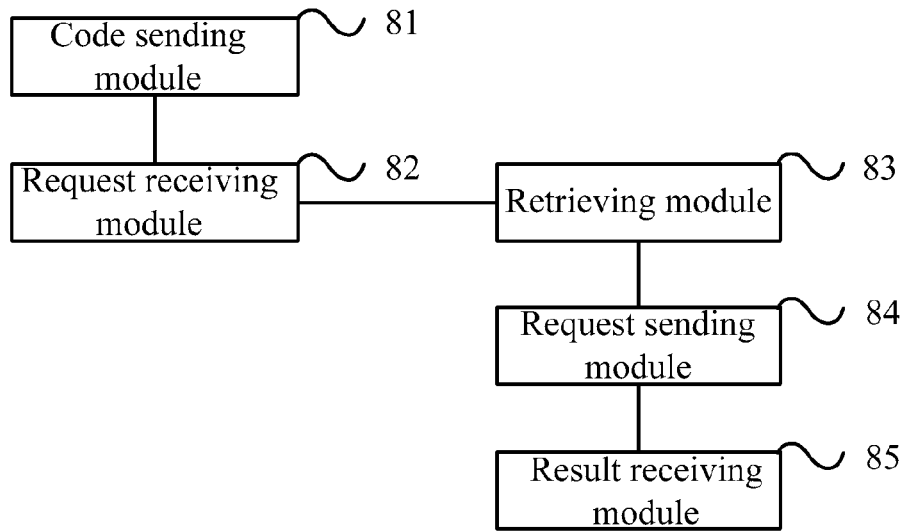
FIG. 9 is a schematic structural diagram of a smart space interface server according to another embodiment of the present disclosure.

FIG. 9 is a schematic structural diagram of a smart space interface server according to another embodiment of the present disclosure. Compared with the smart space interface server shown in FIG. 8, a difference lies in that the smart space interface server shown in FIG. 9 may also include:

a retrieving module 83, configured to retrieve, according to a main service number corresponding to a service number received by the request receiving module 82, a service list stored by the smart space interface server and obtain a function server address corresponding to the main service number;

a request sending module 84, configured to send, according to the function server address obtained by the retrieving module 83, a smart space request to a function server corresponding to the main service number; and a result receiving module 85, configured to receive a processing result of the smart space request sent by the request sending module 84, where the processing result is sent by the function server.

In some embodiments, the code sending module 81 may generate a result mobile code according to the processing result received by the result receiving module 85 and the service number received by the request receiving module 82 and send the result mobile code to the controller.

According to the smart space interface server, access to different smart applications in different smart spaces can be implemented in a uniform manner by using a single controller without preinstalling a control program of a smart space, thereby providing a good expansibility.

Figure 10:
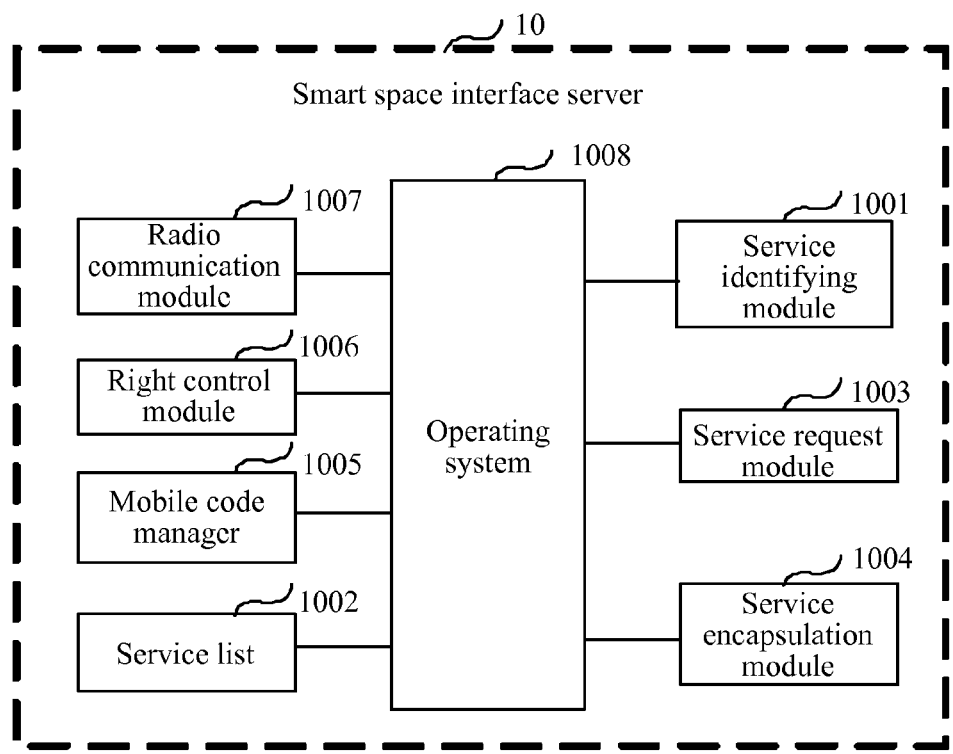
FIG. 10 is a schematic structural diagram of a smart space interface server according to still another embodiment of the present disclosure.

FIG. 10 is a schematic structural diagram of a smart space interface server according to still another embodiment of the present disclosure. As shown in FIG. 10, the smart space interface server 10 may include a service identifying module 1001, a service list 1002, a service request module 1003, a service encapsulation module 1004, a mobile code manager 1005, a right control module 1006, and a radio communication module 1007.

The service identifying module 1001 is configured to receive a service number sent by a controller, then retrieve the service list 1002 according to a main service number of the service number to acquire a function server address, and send the function server address and the service number to the service request module 1003. The service identifying module 1001 may implement the functions of the request receiving module 82 in the embodiments shown in FIG. 8 and FIG. 9, and the retrieving module 83 in the embodiment shown in FIG. 9 in the present disclosure.

The service list 1002 is stored on the smart space interface server 10 and records information such as an address of a function server in the smart space and a main service number. A function server address can be obtained by using a main service number of the function server.

The service request module 1003 is configured to perform, according to the function server address, addressing to a function server that provides an application service and send a smart space request to the function server. The service request module 1003 may implement the function of the request sending module 84 in the embodiment shown in FIG. 9 in the present disclosure.

The service encapsulation module 1004 is configured to encapsulate a processing result of the function server and a service number corresponding to the processing result to generate a result mobile code. The service encapsulation module 1004 may implement the function of the result receiving module 85 in the embodiment shown in FIG. 9 in the present disclosure.

The mobile code manager 1005 is configured to be responsible for managing a mobile code of the smart space interface server 10, perform an operation such as storage, update, and/or deletion for the mobile code, and send the mobile code to the controller. The mobile code manager 1005 always keeps a main mobile code of a smart space to which the smart space interface server 10 belongs. The main mobile code includes a main service interface on which all applications provided by the smart space can be displayed. However, for a controller whose access right is an unauthorized user, the main mobile code is used to display a service reject prompt. The mobile code manager 1005 may implement a part of the functions of the code sending module 81 in the embodiments shown in FIG. 8 and FIG. 9 in the present disclosure.

The right control module 1006 is configured to maintain a service password of a smart space, give authorization according to the service password to establish a radio communication connection between the controller and the smart space interface server 10, and determine an access right of the controller according to a physical address of the controller. In this embodiment, the physical address of the controller may be a MAC address of the controller; and the access right of the controller may be that the controller is a superuser, a common user, an unauthorized user, or the like. The right control module 1006 may implement a part of the functions of the code sending module 81 in the embodiments shown in FIG. 8 and FIG. 9 in the present disclosure.

The radio communication module 1007 is configured to establish a radio communication connection to the controller according to the service password of the smart space. In some embodiments, a short-range radio communication technology such as the Bluetooth® may be used to establish a short-range radio communication connection to the controller.

In addition, in one implementation, to ensure that the modules run, the smart space interface server 10 may further include an operating system 1008.

Figure 11:
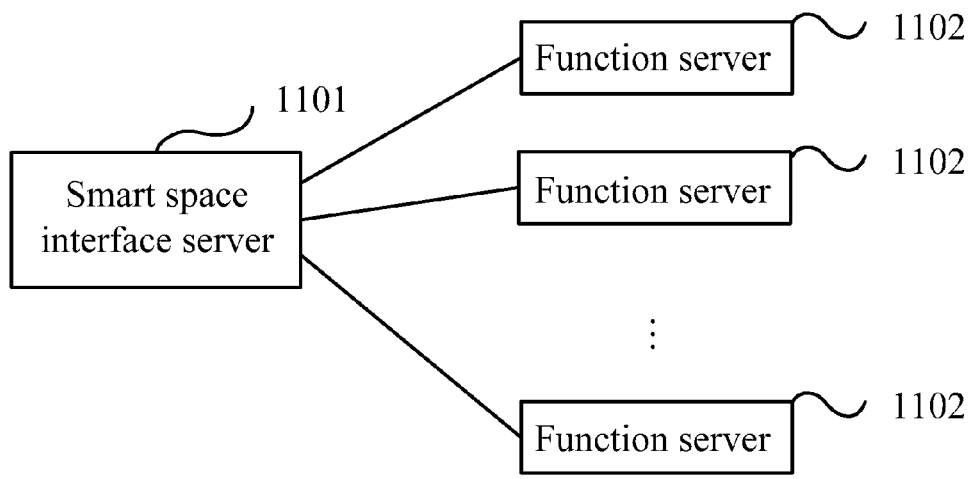
FIG. 11 is a schematic structural diagram of a smart space system according to an embodiment of the present disclosure.

FIG. 11 is a schematic structural diagram of a smart space system according to an embodiment of the present disclosure. In this embodiment, the smart space system is a smart space.

As shown in FIG. 11, the smart space system may include a smart space interface server 1101 and at least one function server 1102.

In some embodiments, for an interaction procedure between the smart space interface server 1101 and the at least one function server 1102, reference may be made to the description in the embodiment shown in FIG. 3 in the present disclosure. Details are not repeated herein.

The smart space interface server 1101 may be implemented by using the smart space interface server provided in the embodiment shown in FIG. 8, FIG. 9, or FIG. 10 in the present disclosure.

According to the smart space system, access to different smart applications in different smart spaces can be implemented in a uniform manner by using a single controller without preinstalling a control program of a smart space, thereby providing a good expansibility.

Figure 12:
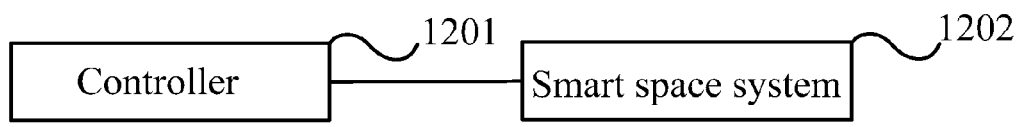
FIG. 12 is a schematic structural diagram of a smart space access system according to an embodiment of the present disclosure.

FIG. 12 is a schematic structural diagram of a smart space access system according to an embodiment of the present disclosure. As shown in FIG. 12, the smart space access system may include a controller 1201 and a smart space system 1202.

In some embodiments, for an interaction procedure between the controller 1201 and the smart space system 1202, reference may be made to the description in the embodiment shown in FIG. 3 in the present disclosure. Details are not repeated herein.

The controller 1201 may be implemented by using the controller provided in the embodiment shown in FIG. 5, FIG. 6, or FIG. 7 in the present disclosure. The smart space system 1202 is a smart space and may be implemented by using the smart space system provided in the embodiment shown in FIG. 11 in the present disclosure.

According to the smart space access system, access to different smart applications in different smart spaces can be implemented in a uniform manner by using a single controller without preinstalling a control program of a smart space, thereby providing a good expansibility.

It should be understood by persons skilled in the art that the accompanying drawings are merely schematic diagrams of an exemplary embodiment, and modules or processes in the accompanying drawings are not necessarily required in implementing the present disclosure.

Persons skilled in the art may understand that the modules in the device according to the embodiments may be distributed in the device of the embodiments as described in the embodiments, or disposed in one or multiple devices which are different from this embodiment after corresponding changes. The modules in the above embodiment may be combined into one module or further separated into multiple sub-modules.

Finally, it should be noted that the foregoing embodiments are merely provided for describing the technical solutions of the present disclosure, but not intended to limit the present disclosure. It should be understood by persons of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present disclosure.

What is claimed is:

1. A smart space access method, comprising:
    determining, by a controller, that the controller enters a smart space in a smart space list stored by the controller based on an obtained smart space number and current location information of the controller, wherein the smart space corresponds to the smart space number;
    receiving, by the controller, a main mobile code that is sent by an interface server of the smart space and corresponds to the smart space;
    loading and executing, by the controller, the main mobile code;
    displaying, by the controller, a main service interface of the smart space, generating a smart space request according to a service number of a selected application that is selected by a user;
    sending, by the controller, the smart space request to the interface server of the smart space;
    receiving, loading, and executing, by the controller, a result mobile code sent by the interface server of the smart space; and
    displaying a processing result of the selected application.

2. The method according to claim 1, before the receiving, by the controller, the main mobile code that is sent by the interface server of the smart space and corresponds to the smart space, the method further comprising:
    acquiring, by the controller, a service password of the smart space from the smart space list; and
    establishing a communication connection to the interface server of the smart space according to the service password.

3. The method according to claim 1, wherein the receiving, by the controller, the main mobile code that is sent by the interface server of the smart space and corresponds to the smart space comprises:
    receiving, by the controller, the main mobile code that is sent by the interface server of the smart space according to an access right of the controller and corresponds to the smart space after the interface server of the smart space determines the access right of the controller according to a physical address of the controller.

4. The method according to claim 3, when the access right of the controller is an unauthorized user, and after the loading and executing, by the controller, the main mobile code, further comprises:
    displaying, by the controller, a service reject prompt.

5. The method according to claim 2, after the displaying the main service interface of the smart space, the method further comprises:
    disconnecting, by the controller, the communication connection to the smart space and deleting the main mobile code sent by the interface server of the smart space if indication information indicating that the controller exits the smart space is received.

6. The method according to claim 1, before the determining, by the controller according to the obtained smart space number and the current location information of the controller, that the controller enters the smart space in the smart space list stored by the controller, the method further comprising:
    establishing, by the controller, a communication connection to a list acquiring smart space according to an obtained smart space number of the list acquiring smart space, and receiving a main mobile code that is sent by an interface server of the list acquiring smart space and corresponds to the list acquiring smart space;
    loading and executing, by the controller, the main mobile code corresponding to the list acquiring smart space;
    displaying, by the controller, at least one smart space list that can be acquired by the controller;
    generating, by the controller, a smart space list acquiring request according to a selected smart space list;
    sending, by the controller, the smart space list acquiring request to the interface server of the list acquiring smart space; and
    receiving, loading, and executing, by the controller, a result mobile code sent by the interface server of the list acquiring smart space, acquiring and storing a smart space list encapsulated in the result mobile code sent by the interface server of the list acquiring smart space, wherein a smart space number, location information, and a service password of at least one smart space in a wide area range are stored in the smart space list.

7. The method according to claim 6, wherein the result mobile code sent by the interface server of the list acquiring smart space is the result mobile code that is encapsulated from a smart space list to which the service password is added and then sent by the interface server of the list acquiring smart space to the controller after the interface server of the list acquiring smart space sends the smart space list acquiring request to a list generating server of the list acquiring smart space and the list generating server adds, according to a physical address of the controller, the service password of a smart space that complies with a predetermined policy to the selected smart space list.

8. A controller, comprising:
    at least one processor; and
    a memory storing program codes that, when executed by the at least one processor, cause the controller to implement the following method:
    determining that the controller enters a smart space in a smart space list stored by the controller based on an obtained smart space number and current location information of the controller, wherein the smart space corresponds to the smart space number;

receiving a main mobile code that is sent by an interface server of the smart space and corresponds to the smart space;

loading and executing the main mobile code;

displaying a main service interface of the smart space, generating a smart space request according to a service number of a selected application that is selected by a user;

sending the smart space request to the interface server of the smart space;

receiving, loading, and executing a result mobile code sent by the interface server of the smart space; and displaying a processing result of the selected application.

9. The controller according to claim 8, before the receiving the main mobile code that is sent by the interface server of the smart space and corresponds to the smart space, the method further comprising:

acquiring a service password of the smart space from the smart space list; and establishing a communication connection to the interface server of the smart space according to the service password.

10. The controller according to claim 8, wherein the receiving the main mobile code that is sent by the interface server of the smart space and corresponds to the smart space comprises:

receiving the main mobile code that is sent by the interface server of the smart space according to an access right of the controller and corresponds to the smart space after the interface server of the smart space determines the access right of the controller according to a physical address of the controller.

11. The controller according to claim 10, when the access right of the controller is an unauthorized user, and after the loading and executing the main mobile code, further comprises:

displaying a service reject prompt.

12. The controller according to claim 9, after the displaying the main service interface of the smart space, the method further comprises.

disconnecting the communication connection to the smart space and deleting the main mobile code sent by the interface server of the smart space if indication information indicating that the controller exits the smart space is received.

* * * * *